US008124264B2

(12) United States Patent
Yamamoto et al.

(10) Patent No.: US 8,124,264 B2
(45) Date of Patent: Feb. 28, 2012

(54) ION-CONDUCTIVE MATERIAL AND USE THEREOF

(75) Inventors: Hisashi Yamamoto, Nagoya (JP); Masaki Matsui, Susono (JP); Hiroki Awano, Susono (JP); Motoshi Isono, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 580 days.

(21) Appl. No.: 11/991,010

(22) PCT Filed: Aug. 24, 2006

(86) PCT No.: PCT/JP2006/316647
§ 371 (c)(1),
(2), (4) Date: Apr. 30, 2009

(87) PCT Pub. No.: WO2007/023920
PCT Pub. Date: Mar. 1, 2007

(65) Prior Publication Data
US 2009/0214939 A1    Aug. 27, 2009

(30) Foreign Application Priority Data
Aug. 26, 2005    (JP) .................................. 2005-245897

(51) Int. Cl.
*H01M 6/14* (2006.01)
(52) U.S. Cl. .................... 429/102; 429/199; 252/62.2
(58) Field of Classification Search .................. 429/102, 429/199; 252/62.2
See application file for complete search history.

(56) References Cited

U.S. PATENT DOCUMENTS 5,683,832 A * 11/1997 Bonhote et al. .............. 252/62.2
5,827,602 A * 10/1998 Koch et al. .................... 429/328
6,063,522 A *  5/2000 Hamrock et al. ............. 429/200
6,210,835 B1   4/2001 Arai
6,350,545 B2 *  2/2002 Fanta et al. ................... 429/307
6,531,241 B1 *  3/2003 McEwen ....................... 429/499

(Continued)

FOREIGN PATENT DOCUMENTS
JP         11-307123        11/1999
(Continued)

OTHER PUBLICATIONS
Machine translation of JP 2005/139100, Jun. 2005.*
(Continued)

*Primary Examiner* — Helene Klemanski
(74) *Attorney, Agent, or Firm* — Finnegan, Henderson, Farabow, Garrett & Dunner, LLP

(57) ABSTRACT

Disclosed is an ion-conductive material which comprises an ionic liquid and can realize a higher level of safety. Also disclosed is an electrochemical device using the ion-conductive material. Further disclosed is a method for manufacturing an electrochemical device. An ion-conductive material comprising an ionic liquid satisfying the following conditions: the ionic liquid comprises two or more types of anion, such that at least one type thereof is an anion having a structure in which one or more electron-withdrawing groups are bonded to a central atom having one more non-covalent electron pairs; and the ionic liquid has a maximum exothermic heat-flow peak height no greater than 2 W/g as measured by DSC (measurement temperature range: ordinary temperature to 500° C., rate of temperature rise: 2° C./minute). Preferably, the ion-conductive material comprises an ionic liquid having a gross calorific value of no greater than 1000 J/g as measured by the DSC.

5 Claims, 1 Drawing Sheet

U.S. PATENT DOCUMENTS

| | | | |
|---|---|---|---|
| 7,582,380 B1 * | 9/2009 | Dunstan et al. | 429/188 |
| 2001/0010877 A1 | 8/2001 | Arai | |
| 2003/0211389 A1 | 11/2003 | Schlaikjer | |
| 2004/0038127 A1 * | 2/2004 | Schlaikjer | 429/199 |
| 2005/0158623 A1 | 7/2005 | Matsui et al. | |
| 2005/0175867 A1 | 8/2005 | Adachi et al. | |

FOREIGN PATENT DOCUMENTS

| | | |
|---|---|---|
| JP | 2003-331918 | 11/2003 |
| JP | 2004-155765 | 6/2004 |
| JP | 2004-253357 | 9/2004 |
| JP | 2005-104845 | 4/2005 |
| JP | 2005-104846 | 4/2005 |
| JP | 2005-139100 | 6/2005 |
| JP | 2005-183195 A | 7/2005 |
| JP | 2005-229103 | 8/2005 |
| JP | 2006-190618 | 7/2006 |
| WO | WO 03/106419 | 12/2003 |

OTHER PUBLICATIONS

Machine translation of JP 2006/190618, Jul. 2006.*
International Search Report, dated Nov. 28, 2006.
The Second Office Action for Chinese Appl. No. 200680030900.4 dated Jan. 19, 2011.
Korean Office Action for Korean Patent App. No. 10-2008-7007180, dated Feb. 25, 2010.
The First Office Action from the Chinese Patent Office for CN 200680030900.4 dated Jun. 12, 2010.
Notification of Reasons for Rejection for JP Appl. No. 2005-245897 dated Apr. 27, 2010.

* cited by examiner

ION-CONDUCTIVE MATERIAL AND USE THEREOF

TECHNICAL FIELD

The present application claims priority based on Japanese Patent Application 2005-245897 filed on Aug. 26, 2005, the entire contents of which are hereby incorporated by reference within this application.

The present invention relates to an ion-conductive material comprising an ionic liquid. Also, the present invention relates to an electrochemical device (for instance, a lithium battery) comprising the ion-conductive material, and to a method for manufacturing such an electrochemical device.

BACKGROUND ART

Ordinarily, ionic liquids (also called ambient-temperature molten salts) are nonvolatile and flame retardant liquids that have no flash point. For this reason, they are employed in various electrolytes of electrochemical devices or as constituent elements thereof, with the expectation of contributing to enhance device safety. Their use has been considered, for instance, in electrochemical devices (typically, secondary batteries) in which overcharge may occur due to erroneous operation or the like. Japanese Patent Application Laid-open Publication No. 2003-331918 describes a technology in which an ambient-temperature molten salt, which combines a specific cyclic ammonium cation and a specific anion, is used as a solvent of the electrolyte of a lithium secondary battery. Japanese Patent Application Laid-open Publication No. 2004-253357 is another prior art document that relates to an electrolyte using an ambient-temperature molten salt. Further, Japanese Patent Application Laid-open Publication No. H11-307123 is a prior art document that, although not related to an ambient-temperature molten salt, relates to an electrolyte composition that enhances the safety of a lithium secondary battery (by making the electrolyte non-combustible).

DISCLOSURE OF THE INVENTION

These various ionic liquids having no flash point, however, may afford different levels of safety. It would thus be advantageous to provide an ionic liquid that realizes a higher level of safety, and to provide as well an ion-conductive material comprising the ionic liquid.

Thus, it is an object of the present invention to provide an ion-conductive material that comprises an ionic liquid and that realizes a higher level of safety. Another object of the present invention is to provide an electrochemical device using the ion-conductive material, and a method for manufacturing the electrochemical device. A further related object of the present invention is to provide an ionic liquid that allows the realization of a higher safety level, an ion-conductive material comprising the ionic liquid, a method for manufacturing the ion-conductive material, as well as a method for designing the ionic liquid and the ion-conductive material comprising the ionic liquid.

An ion-conductive material of the present invention comprises an ionic liquid that satisfies the conditions below.

(a) The ionic liquid comprises two or more types of anion, such that at least one type thereof is an anion having a structure in which one or more electron-withdrawing groups are bonded to a central atom having one or more non-covalent electron pairs.

(b) The ionic liquid has a maximum exothermic heat-flow peak height no greater than 2 W/g as measured by DSC (measurement temperature range: ordinary temperature to 500° C., rate of temperature rise: 2° C./minute).

The ion-conductive material of the present invention exhibits high safety (for instance, being hard to ignite). Accordingly, using the ion-conductive material as a constituent element (electrolyte or the like) of various electrochemical devices allows imparting a higher safety level to the devices. Particularly preferred is an ion-conductive material comprising the above ionic liquid that comprises two or more types of anion having a structure in which one or more electron-withdrawing groups are bonded to a central atom having one or more non-covalent electron pairs.

In the ion-conductive material of the present invention, preferably, the ionic liquid has a gross calorific value of no greater than 1000 J/g as measured by the DSC. The ion-conductive material allows the realization of a higher safety level.

Preferably, the two or more types of anion are selected from the group consisting of formulas (1) to (3)

[Formula 1]

wherein $R^1$ to $R^6$ are any group selected from among a perfluoroalkyl group, a perfluorosulfonyl group, or a perfluoroacetate group.

The present invention provides an electrochemical device (secondary battery or the like) comprising any one of the above-described ion-conductive materials. A device having the aforementioned constitution is safer than an electrochemical device using an electrolyte comprising, for instance, a combustible organic solvent instead of the above ion-conductive material.

Another invention disclosed herein is a method for manufacturing an electrochemical device comprising an ion-conductive material that comprises an ionic liquid. Such a method comprises a step of selecting an ionic liquid having a maximum exothermic heat-flow peak height no greater than 2 W/g as measured by DSC (measurement temperature range: ordinary temperature to 500° C., rate of temperature rise: 2° C./minute). The method also comprises a step of preparing an ion-conductive material comprising the ionic liquid. The method comprises further, a step of manufacturing an electrochemical device using the ion-conductive material. Although not limited thereto, there can be selected, as the above ionic liquid, preferably an ionic liquid comprising at least one type of anion (preferably, two or more types) having a structure in which one or more electron-withdrawing groups are bonded to a central atom having one or more non-covalent electron pairs.

Preferably, an ionic liquid is selected having a gross calorific value no greater than 1000 J/g as measured by the above DSC.

This manufacturing method allows suitable manufacturing of an electrochemical device (for instance, a secondary battery) having a higher safety level.

The ion-conductive material can be preferably manufactured (prepared) by selecting two or more types of salt differing in anion type, and by mixing the salts in proportion to form an ionic liquid that satisfies the above maximum exothermic peak height.

The two or more types of salt can be selected, for instance, in a way so as to comprise a first salt having a maximum exothermic peak height smaller than 2 W/g, and a second salt having a greater maximum exothermic peak height than that of the first salt (for example, a maximum exothermic peak height of 2 W/g or more) as measured by DSC. Mixing the two or more types of salt yields a preferable ionic liquid having a maximum exothermic peak height that is lower than at least that of the second salt.

Also, mixing two or more types of salt differing in anion type to prepare thereby an ionic liquid is preferable since the resulting ionic liquid has a maximum exothermic peak height that is lower than that of any of the salts. Preferably, the mixing proportion of the two or more types of salt is adjusted so as to form an ionic liquid exhibiting the previously mentioned maximum exothermic peak height.

The ion-conductive material can also be manufactured (prepared) preferably by selecting two or more types of salt differing in anion type; and mixing the salts in proportion to form an ionic liquid that satisfies the above maximum exothermic peak height and the above gross calorific value.

The two or more types of salt can be selected in a way so as to comprise, for example, a first salt having a gross calorific value smaller than 1000 J/g (typically, a salt having a maximum exothermic peak height smaller than 2 W/g and a gross calorific value smaller than 1000 J/g); and a second salt having a gross calorific value greater than that of the first salt (for example, a salt having a gross calorific value of 1000 J/g or more, and typically a salt having a maximum exothermic peak height of 2 W/g or more and a gross calorific value of 1000 J/g or more). Through the mixing of these salts an ionic liquid having a smaller gross calorific value (more preferably, a smaller gross calorific value and a smaller maximum exothermic peak height) than that of at least the second salt is prepared.

Through the mixing of two or more types of salt differing in anion type, an ionic liquid having a smaller gross calorific value (more preferably, a smaller gross calorific value and a smaller maximum exothermic peak height) than that of any of the salts is prepared. Preferably, the mixing proportion of the two or more types of salt is adjusted so as to form an ionic liquid exhibiting the aforementioned gross calorific value.

Preferably, an anion of at least one type of salt among the two or more types of salt is an anion having a structure in which one or more electron-withdrawing groups are bonded to a central atom having one or more non-covalent electron pairs. Preferably, the two or more types of salt are selected in a way so as to form an ionic liquid comprising two or more types of anion (for instance, an anion selected from the group consisting of formulas (1) to (3)) having a structure in which one or more electron-withdrawing groups are bonded to a central atom having one or more non-covalent electron pairs.

BEST MODE FOR CARRYING OUT THE INVENTION

Figure 1:
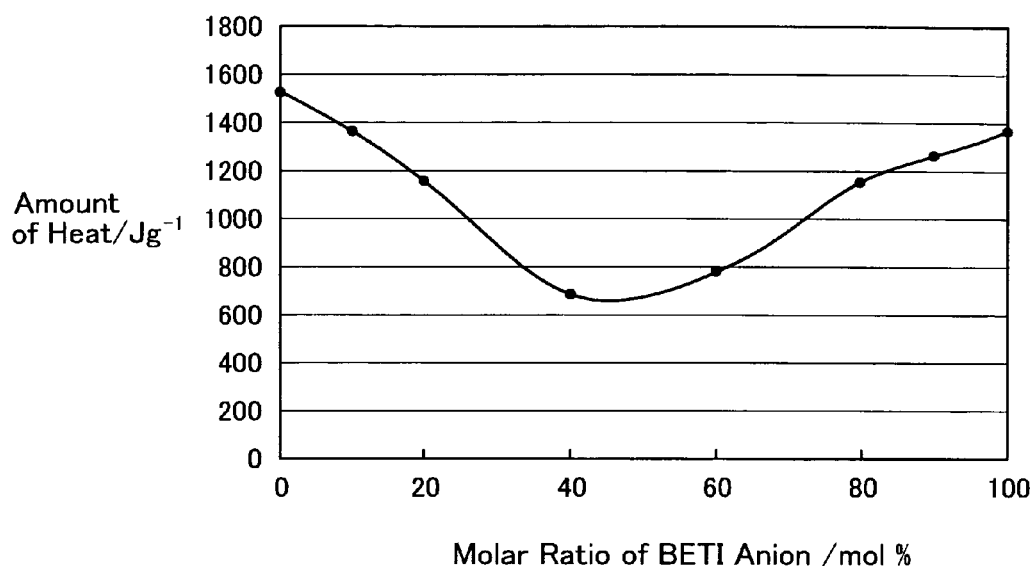
FIG. 1 is a graph illustrating the relationship between ionic liquid composition and gross calorific value.

The ion-conductive material of the present invention comprises an ionic liquid having a predefined anion composition, and having a maximum exothermic heat-flow peak height, as determined by DSC, no greater than a predefined value. Herein, "ionic liquid" means a composition comprising one, two, or more compounds (typically salts) having essentially ionic bonding characteristics, the composition being liquid in a temperature range in the vicinity of ordinary temperature (ordinary temperature range). The "ordinary temperature range" means a temperature range having, for instance, an upper limit of substantially 80° C. (typically of substantially 60° C., or substantially 40° C. in some cases), and a lower limit of substantially −20° C. (typically substantially 0° C., or substantially 20° C. in some cases). Preferably, the ionic liquid exhibits a liquid state over at least part of the ordinary temperature range. Preferably, the ionic liquid exhibits a liquid state at least at substantially 25° C.; more preferably, the ionic liquid can be kept in a liquid state (fused state) over an entire temperature range extending from at least substantially 20° C. to 40° C. (more preferably, from substantially 0° C. to 60° C., and yet more preferably from substantially 20° C. to 80° C.).

Although ionic liquids normally have no flash point (for instance, as measured in accordance with the flash point test method set forth in JIS K2265), many of them release comparatively large amounts of heat upon decomposition (for example, thermal decomposition). The inventors focused on the exothermal behavior of ionic liquids during decomposition, and found out that an ion-conductive material comprising an ionic liquid having a lower degree of quickness of heat release through decomposition. (i.e. the speed with which the decomposition reaction proceeds) allows the achievement of a higher level of safety. For instance, even a secondary battery that uses in the electrolyte thereof, an ion-conductive material comprising an ionic liquid having no flash point, may experience decomposition of the ionic liquid (thermal decomposition or the like) when the secondary battery is brought to a significant overcharge state. In that case, mitigating the tendency of the ionic liquid in the electrolyte to decompose suddenly would allow curbing the extent of cell temperature increase under harsh conditions. The exothermic behavior of the above ionic liquid can be ascertained, for instance, on the basis of a heat flow profile determined by DSC. The DSC measurement can be carried out, for instance, using a differential calorimeter "DSC 2910" (TA Instruments).

The ionic liquid in the ion-conductive material disclosed herein is preferably an ionic liquid having a maximum exothermic heat-flow peak height no greater than substantially 2 W/g (more preferably, no greater than substantially 1.5 W/g) as measured by DSC (measurement temperature range: ordinary temperature to 500° C., rate of temperature rise: 2° C./minute). The "maximum exothermic peak height" can be read, for example, from a heat absorption and release chart of a DSC measurement, or can be detected electrically. The maximum exothermic peak height corresponds ordinarily to the exothermic peak height resulting from the decomposition (thermal decomposition or the like) of the ionic liquid. A smaller exothermic peak height means that the release of heat that accompanies the decomposition of the ionic liquid is less sudden. An ion-conductive material comprising such an ionic liquid allows achievement of a better safety level. In a preferred ionic liquid, the temperature at the apex of the maximum exothermic peak of the ionic liquid is substantially 380° C. or higher (for instance, 380° C. to 450° C.), and more preferably, of 400° C. or higher (for instance, 400° C. to 450° C.).

The ionic liquid in the ion-conductive material disclosed herein comprises two or more types of anion. At least one type among the anions is an anion having a structure in which one or more electron-withdrawing groups are bonded to a central atom having one or more non-covalent electron pairs. A more preferred ionic liquid comprises two or more types of anion having a structure in which one or more electron-withdrawing groups are bonded to a central atom having one or more non-covalent electron pairs. An ionic liquid having the aforementioned anion composition is less prone to abrupt heat release upon decomposition, even under harsh conditions where the anion decomposes (thermal decomposition or the like).

An ionic liquid having the above mentioned anion composition and exhibiting a maximum exothermic peak height within the above range is an ionic liquid having good stability. An ion-conductive material comprising the ionic liquid exhibits good stability. An electrochemical device such as a secondary battery or the like, in which the above ionic liquid or ion-conductive material is used in the electrolyte, thus has excellent safety.

Preferably, the ion-conductive material meets the above condition regarding maximum exothermic peak height, and comprises an ionic liquid having a lower decomposition calorific value. Such an ion-conductive material is excellent, particularly in safety. The magnitude of the decomposition calorific value of the ionic liquid can be ascertained by carrying out a DSC measurement under predefined conditions. The ionic liquid comprised in the ion-conductive material provided by the present invention is preferably an ionic liquid having a gross calorific value no greater than substantially 1300 J/g, more preferably having a gross calorific value no greater than substantially 1000 J/g, and yet more preferably having a gross calorific value no greater than substantially 800 J/g, as measured by DSC from ordinary temperature to 500° C. at a temperature increase rate of 2° C./minute.

The central atom of the two or more types of anion in the above ionic liquid is, typically, an atom having one or more non-covalent electron pairs in an anion state. The central atom is an atom belonging to any one of groups 14 to 16 in a long-form periodic table (which displays groups 1 to 18). For instance, the central atom is selected from the group consisting of carbon (C), nitrogen (N), oxygen (O), silicon (Si), phosphorus (P) and sulfur (S). Preferably, the central atom is selected from the group consisting of C, N and O.

Suitable examples of the electron-withdrawing group bonded to the aforementioned type of central atom include a perfluoroalkyl group (hereinafter denoted as "$R^f$"), a perfluorosulfonyl group, or a perfluoroacetate group. In particular, a preferred electron-withdrawing group is selected from the group consisting of a carbon number from 1 to 6 (preferably, a carbon number from 1 to 4, more preferably a carbon number from 1 to 2), perfluoroalkyl group, a perflurosulfonyl group having such a perfluoroalkyl group, or a perfluoroacetate group having the aforementioned perfluoroalkyl group. A linear perfluoroalkyl group is preferable. In particular, the electron-withdrawing group is preferably a trifluoromethyl group ($CF_3$) or a pentafluoroethyl group ($CF_3CF_2$). In an anion structure in which two or more electron-withdrawing groups are bonded to one central atom, the electron-withdrawing groups may be identical or different.

The ionic liquid preferably comprises two or more types of anions selected from the group consisting of formulas (1) to (3) below.

[Formula 2]

(1)

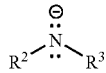
(2)

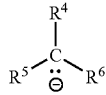
(3)

(wherein $R^1$ to $R^6$ are any group selected from among a perfluoroalkyl group, a perfluorosulfonyl group, or a perfluoroacetate group).

Suitable examples of $R^1$ to $R^6$ include groups represented by formulas $R^f$, $SO_2R^f$ or $COR^f$.

The $R^f$ in these groups are preferably the linear alkyl group of carbon number from 1 to 6 (preferably, carbon number from 1 to 4, more preferably carbon number from 1 to 2). Preferred examples of $R^f$ are, in particular, a trifluoromethyl group ($CF_3$) or a pentafluoroethyl group ($CF_3CF_2$).

The ionic liquid can comprise two or more types of anion selected from anions represented by among any one of formulas (1) to (3). The ionic liquid may comprise one more types of anion selected from anions represented by any one of the formulas (1) to (3), and one or more types of anion selected from anions represented by any other formula. Preferably the two or more types of anion in the ionic liquid are two or more types of anion selected from the anions represented by among any one of the formulas (1) to (3). The two or more types of anion are preferably a combination of anions having electron-withdrawing groups of identical chemical structure except differ in the number of carbon atoms in a perfluoroalkyl group. Examples of such anion combinations include, a combination of $(CF_3SO_2)O^-$ and $(CF_3CF_2SO_2)O^-$; a combination of $(CF_3SO_2)_3C^-$ and $(CF_3CF_2SO_2)_3C^-$; a combination of $(CF_3SO_2)_2N^-$ and $(CF_3CF_2SO_2)_2N^-$; a combination of $(CF_3SO_2)(CF_3)N^-$ and $(CF_3CF_2SO_2)(CF_3)N^-$; or two or more combinations selected from $(CF_3SO_2)(CF_3CO)N^-$, $(CF_3CF_2SO_2)(CF_3CO)N^-$ and $(CF_3SO_2)(CF_3CF_2CO)N^-$.

Although not intended to limit in any way the present invention, safety is enhanced (as ascertained, for instance, from a decrease in the maximum exothermic peak height, reduced gross calorific value and the like as measured by DSC), due to an ionic liquid comprising two or more types of anion of a structure in which one or more electron-withdrawing groups are bonded to a central atom having one or more non-covalent electron pairs. This ionic liquid is conjectured to be as follows.

When heating a salt comprising an anion of a structure in which one or more electron-withdrawing groups are bonded to a central atom having one or more non-covalent electron pairs, the resulting motion of the electrons that make up the non-covalent electron pair gives rise to radicals whereby the anion decomposes. The mechanism involved in radical generation and decomposition will be illustrated based on an example for $(CF_3SO_2)_2N^-$ (bis(trifluoromethylsulfonylimide) anion, hereinafter "TFSI" anion).

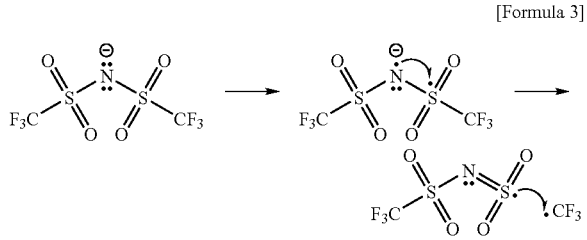

[Formula 3]

Radical generation and decomposition also take place in $(CF_3CF_2SO_2)_2N^-$ (bis(perfluoroethylsulfonylimide) anion, hereinafter "BETI anion") through the same mechanism as in the TFSI anion. When the BETI anion is also present upon heating of the TFSI anion, the following reactions take place between these anion species.

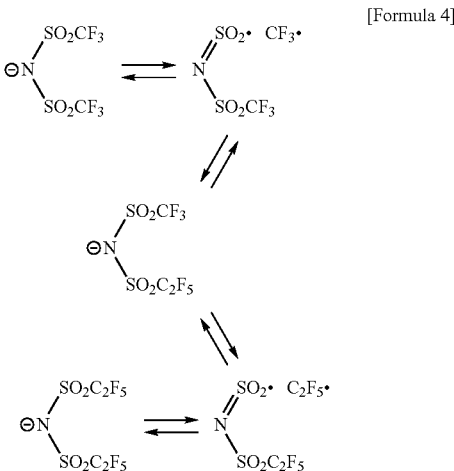

[Formula 4]

Thus, when the TFSI anion is heated under the co-presence of the BETI anion, radical cleavage and recombination of the anions result in the formation of an anion $(CF_3SO_2)(CF_3CF_2SO_2)N^-$ having a structure different from those of both the TFSI anion and the BETI anion. This increases the kinds of reactions taking place within the system, and thus reduces the reaction heat resulting from the respective reactions. These reactions occur with mutually different ease. Therefore, this allows mitigation of the phenomenon of quick decomposition, even under harsh conditions, that leads to anion decomposition in the ionic liquid. As a result, this curbs the rise in battery temperature due to electrolyte decomposition in batteries in which, for instance, the electrolyte uses an ion-conductive material comprising such an ionic liquid, thus affording a high level of safety.

In the ionic liquid containing two types of anion having a structure in which one or more electron-withdrawing groups are bonded to a central atom having one or more non-covalent electron pairs, the mole ratio of the anions is preferably in the range from substantially 10:90 to 90:10, more preferably in the range from substantially 20:80 to 80:20, and yet more preferably in the range from substantially 30:70 to 70:30. The effect afforded by the presence of two types of anion is further enhanced in an ionic liquid having such an anion composition.

An ionic liquid having the aforementioned anion composition allows bringing out ideally, for instance, the effect of reducing the maximum exothermic heat-flow peak value and/or the gross calorific value of the ionic liquid (and consequently the effect of enhancing the safety of the ion-conductive material comprising the ionic liquid).

The cations comprised in the ionic liquid disclosed herein are not particularly limited. The cation comprised in the ionic liquid disclosed herein may by the same cations as used normally in conventional ionic liquids (typically, monovalent cations). The ionic liquid disclosed herein comprises one, two, or more types of cation selected from the group consisting of inorganic cations such as cations of alkaline metals like lithium (Li), sodium (Na), potassium (K); cations of transition metals such as silver (Ag), copper (Cu), gold (Au); and organic cations such as imidazolium ions having or not having a substituent group (cation comprising an imidazole backbone, similarly hereinafter), thiazolium ions, oxazolium ions, isooxazolium ions, triazolium ions, pyridinium ions, pyridazinium ions, pyrimidinium ions, pyrazinium ions, ammonium ions, phosphonium ions, and sulfonium ions.

The ion-conductive material disclosed herein may be an ion-conductive material comprising essentially an ionic liquid. That is, another aspect of the invention disclosed herein is an ionic liquid and an electrochemical device comprising the ionic liquid, wherein the ionic liquid satisfies the following conditions: comprising two or more types of anion, wherein at least one type among these anions is an anion having a structure in which one or more electron-withdrawing groups are bonded to a central atom having one or more non-covalent electron pairs (preferably, the ionic liquid comprises two or more types of anion having a structure in which one or more electron-withdrawing groups are bonded to a central atom having one or more non-covalent electron pairs), and having a maximum exothermic heat-flow peak height no greater than 2 W/g as measured by DSC (measurement temperature range: ordinary temperature to 500° C., rate of temperature rise: 2° C./minute). Preferably, the ionic liquid and the electrochemical device comprises such an ionic liquid that further satisfies the condition of having a gross calorific value no greater than 1300 J/g (more preferably, no greater than 1000 J/g as measured by DSC).

Provided that the effect of the invention is not substantially impaired thereby, the ion-conductive material disclosed herein may also comprise, in addition to the ionic liquid, other ionic or nonionic constituents. For instance, the ion-conductive material may have a composition that comprises an ionic liquid resulting from mixing two or more salts (preferably, ambient-temperature molten salts) of a cation and an anion of a structure in which one or more electron-withdrawing groups are bonded to a central atom having one or more non-covalent electron pairs, the composition of the ion-conductive material containing essentially no nonionic compounds. Alternatively, the composition of the ion-conductive material may comprise a nonionic compound in addition to an ionic-bond compound (typically a salt). Examples of nonionic compounds include noncombustible nonionic solvents (fluorine-based organic solvents, phosphate esters and the like). Preferably, the composition of the ion-conductive material contains essentially no combustible solvent. Preferably, the content ratio of such nonionic compounds (nonionic solvent or the like) is smaller than the content ratio of the ionic liquid. For example, the content of nonionic compound is no greater than 40 parts by weight, more preferably no greater than 25%, and yet more preferably no greater than 10%, relative to 100 parts by weight of the ionic liquid. The proportion by weight of ionic liquid in the ion-conductive material is preferably no lower than 50 wt %, more preferably no lower than 70 wt %, and yet more preferably no lower than 85 wt %.

The ion-conductive material disclosed herein can be used as an electrolyte comprised in various kinds of electrochemical devices (for instance, storage elements such as batteries, capacitors, and the like). For instance, an ion-conductive material comprising essentially an ionic liquid resulting from mixing two or more ambient-temperature molten salts having different anions can be used preferably as an electrolyte in various secondary batteries (lithium secondary batteries and the like). An ion-conductive material having a composition in which a supporting electrolyte (supporting salt) has been dissolved in the ionic liquid may also be used as an electrolyte. For example, an ion-conductive material comprising an ionic liquid resulting from mixing two or more ambient-temperature molten salts having different anions, and a lithium salt as a supporting electrolyte, can be used preferably as an electrolyte in lithium secondary batteries. The lithium salt may be any of various lithium salts known as supporting electrolytes for ordinary lithium secondary batteries. The composition of a preferred ion-conductive material comprises, for instance, one, two, or more lithium salts selected from the group consisting of $LiBF_4$, $LiPF_6$, $LiClO_4$, $LiN(SO_2CF_3)_2$, $LiN(SO_2CF_2CF_3)_2$, $LiOSO_2CF_3$, $LiOSO_2C_4F_9$, and $LiC(SO_2CF_3)_3$. The concentration of the supporting electrolyte is not particularly limited, but preferably it is at least a type that allows the supporting electrolyte to dissolve stably at 25° C. The composition may contain herein substantially 0.1 to 15 moles (preferably, 0.5 to 10 moles) of supporting electrolyte per liter (L) of electrolyte.

As the positive electrode comprised in a lithium battery (typically, a lithium secondary battery) comprising such an electrolyte, a positive electrode collector having adhered thereon a positive electrode active material can be used. As the positive electrode collector, a rod-like member, a plate-like member, a foil-like member, a mesh-like member or the like having aluminum (Al), nickel (Ni) titanium (Ti) or the like as a main constituent may be used. Alternatively, carbon paper or the like may also be used as the positive electrode collector. As the positive electrode active material, an oxide-type positive electrode active material having a layered structure (employed in ordinary lithium batteries) or an oxide-type positive electrode active material having a spinel-structure can be used. For instance, a positive electrode active material having, as a main component thereof, a lithium cobalt complex oxide (typically $LiCoO_2$), a lithium nickel complex oxide (typically $LiNiO_2$), a lithium manganese complex oxide (typically $LiMn_2O_4$) or the like can be used. These positive electrode active materials may be in the form of a positive electrode mix, together with a conductive material, a binder and the like, as the case may require. The positive electrode mix is adhered to the positive electrode collector to yield a positive electrode. As the conductive material a carbon material such as carbon black (acetylene black or the like), or a conductive metallic powder such as nickel powder or the like may be used. As the binder, polyvinylidene fluoride (PVdF), polytetrafluoroethylene (PTFE), polyvinylidene fluoride-hexafluoropropylene copolymer (PVdF-HFP), styrene-butadiene block copolymer (SBR) or the like can be used. Although not particularly limited thereto, the amount of conductive material used can be in the range of 1 to 15 parts by weight relative to 100 parts by weight of the positive electrode active material. Also, the amount of binder used can be in the range of substantially 1 to 10 parts by weight relative to 100 parts by weight of the positive electrode active material.

As the negative electrode, a negative electrode in which a negative electrode active material is adhered to a negative electrode collector can be used. As the negative electrode collector, a rod-like member, a plate-like member, a foil-like member, a mesh-like member or the like having aluminum (Al), nickel (Ni), copper (Cu) or the like as a main constituent can be used. Alternatively, carbon paper or the like may also be used as the negative electrode collector. As the negative electrode active material, a carbon material having an amorphous structure and/or a graphite structure can be used. For example, natural graphite, mesocarbon microbeads (MCMB), highly oriented pyrolytic graphite (HOPG), hard carbon, soft carbon or the like can be used as the negative electrode active material. As the negative electrode active material Si, Sn or the like may also be used. Lithium titanate (for instance $Li_4Ti_5O_{12}$) may also be used as the negative electrode active material. These negative electrode active materials may be in the form of a negative electrode mix, together with a binder and the like, as the case may require. The negative electrode mix is adhered to the negative electrode collector to yield a negative electrode. As the binder, the same binders used for the positive electrode can be used. Other negative electrode structures that can be used include Li (metal) foil, Si vapor-deposition film, Sn-plated foil or the like.

As a separator, a porous film comprising a polyolefin resin such as polyethylene (PE), polypropylene (PP) or the like may be used. Herein a woven or nonwoven fabric comprising polypropylene, polyethylene terephthalate (PET), methyl cellulose or the like may be used also.

In the method for manufacturing an electrochemical device disclosed herein, an ionic liquid having a maximum exothermic heat-flow peak height no greater than 2 W/g (more preferably, no greater than 1.5 W/g) as measured by DSC (measurement temperature range: ordinary temperature to 500° C., rate of temperature rise: 2° C./minute) is selected as a constituent of an ion-conductive material comprised in the electrochemical device. Preferably, the ionic liquid having an exothermic peak temperature of 300° C. or above (more preferably, of 400° C. or above) is selected. Provided that they form the ionic liquid satisfying the above characteristic values, the anions and cations in the ionic liquid are not particularly limited to the above structures or types. For instance, an ionic liquid can be selected having one, two, or more types of anion selected from the group consisting of anions having a structure in which one or more electron-withdrawing groups are bonded to a central atom having one or more non-covalent electron pairs, and anions having a structure in which one or more electron-withdrawing groups are bonded to a central atom lacking a non-covalent electron pair ($BF_4^-$, $BOB^-$, $PF_6^-$ or the like). Preferably, the ionic liquid comprises at least one type of anion (preferably, two or more types) having a structure in which one or more electron-withdrawing groups are bonded to a central atom having one or more non-covalent electron pairs. An also preferred ionic liquid comprises one, two, or more types of anion having a structure in which one or more electron-withdrawing groups are bonded to a central atom having one or more non-covalent electron pairs, and at least one type of anion having a non-covalent electron pair, and anions having a structure in which one or more electron-withdrawing groups are bonded to a central atom having one or more non-covalent electron pairs. Preferably, an ionic liquid having a gross calorific value no greater than 1300 J/g (more preferably no greater than 1000 J/g, and yet more preferably no greater than 800 J/g), as measured by DSC is selected.

The ionic liquid can be prepared, for instance, by way of an operation that comprises selecting two or more types of salt differing in anion type, and mixing the salts in a proportion that forms the ionic liquid which satisfies the above maximum exothermic peak height. The two or more types of salt need only be such that the ionic liquid prepared using the salts is liquid at ambient temperature (the salts are not limited to each be liquid at ambient temperature). Preferably, however, two or more types of salt are selected, each being an ambient-temperature molten salt. In other words, the ionic liquid is preferably obtained by mixing two or more types of ambient-temperature molten salts. The two or more types of salt can be selected so as to include a first salt having a maximum exothermic peak height smaller than an upper limit value of a target maximum exothermic peak height of the ionic liquid (for instance, 2 W/g, more preferably, 1.5 W/g), and a second salt having a greater maximum exothermic peak height than that of the first salt.

The maximum exothermic peak height of the second salt selected may thus be greater than the upper limit value of the target maximum exothermic peak height of the ionic liquid, but also, equal to or smaller than an upper limit value.

In a preferred embodiment, the two or more types of salt are mixed in a proportion that forms an ionic liquid which has a maximum exothermic peak height that is lower than the maximum exothermic peak height of at least one salt among the two or more types of salt. In a particularly preferred embodiment, the two or more types of salt are mixed to a proportion such that the ionic liquid formed has a maximum exothermic peak height that is lower than that of any of the salts. Samples 3 to 7 in the examples to follow hereafter illustrate ionic liquids having a maximum exothermic peak height that is lower than either salt in a mixture of two types of salt.

The manufacturing method of an electrochemical device comprises the step of preparing an ion-conductive material comprising an ionic liquid thus selected. Herein, an ion-conductive material having a predetermined composition can be manufactured by preparing the above ionic liquid, and by then mixing the ionic liquid with other ion-conductive material constituents. The ion-conductive material comprising essentially the above ionic liquid is prepared by preparing the ionic liquid. The electrochemical device is then built using the ion-conductive material. The manufacturing method allows efficient manufacturing of the electrochemical device (for instance, a secondary battery) with higher safety.

Another aspect of the invention disclosed herein is a design method for ion-conductive material (for example, electrolyte) comprising the steps of selecting an ionic liquid having a maximum exothermic peak height not smaller than 2 W/g as measured by DSC (more preferably, an ionic liquid having a maximum exothermic peak height not smaller than 2 W/g and a gross calorific value no greater than 1000 J/g); and preparing the ion-conductive material comprising the ionic liquid. In yet another aspect, the invention is a design method of an electrochemical device (for instance, a secondary battery), comprising the steps of selecting an ionic liquid having a maximum exothermic peak height not smaller than 2 W/g as measured by DSC (more preferably, an ionic liquid having a maximum exothermic peak height not smaller than 2 W/g and a gross calorific value no greater than 1000 J/g); preparing an ion-conductive material comprising the ionic liquid; and building an electrochemical device using the ion-conductive material.

Examples relating to the present invention are explained below. However, the invention is in no way meant to be limited to or by the following examples.

EXAMPLES

Example 1

A salt having an anion of a structure in which one or more electron-withdrawing groups are bonded to a central atom having one or more non-covalent electron pairs was prepared from 1-ethyl-3-methyl imidazolium bis-trifluoromethylsulfonylimide (EMI-TFSI) and 1-ethyl-3-methyl imidazolium bis(perfluoroethylsulfonyl)imide (EMI-BETI). EMI-TFSI and EMI-BETI are both salts exhibiting a liquid state at ambient temperature (ambient-temperature molten salts). These salts comprise an anion having a structure in which a perfluorosulfonyl group, as the electron-withdrawing group, is bonded to N, as the central atom. That is, the EMI-TFSI anion is $(CF_3SO_2)_2N^-$, and the EMI-BETI anion is $(CF_3CF_2SO_2)_2N^-$.

Ionic liquids (samples 2 to 7) comprising two or more types of anion having a structure in which one or more electron-withdrawing groups are bonded to a central atom having one or more non-covalent electron pairs, were prepared by mixing EMI-TFSI and EMI-BETI to the mole ratios given in Table 1. A DSC measurement was performed on the ionic liquids, EMI-TFSI (sample 1) and EMI-BETI (sample 8) using a differential calorimeter "DSC 2910" (TA Instruments). Substantially 2 to 3 mg of the samples to be measured were sealed in containers made of stainless steel (SUS) and then DSC measurement was carried out with a measurement temperature range of: ordinary temperature to 500° C. and rate of temperature rise of: 2° C./minute, as measurement conditions.

FIG. 1 illustrates the relationship between the gross calorific value of each sample obtained based on the DSC measurement, and the molar content ratio of BETI anion (100 mol % being the total sum of TFSI anion and BETI anion). Table 1 lists the maximum exothermic peak height of each sample, as read from the heat absorption and release chart of the DSC measurement. The apexes of the maximum exothermic peaks of the samples were all at 400° C. or above.

TABLE 1

|  | EMI-TFSI [mol %] | EMI-BETI [mol %] | Maximum exothermic peak height [W/g] | Gross calorific value [J/g] |
| --- | --- | --- | --- | --- |
| Sample 1 | 100 | 0 | 3.78 | 1539 |
| Sample 2 | 90 | 10 | 1.90 | 1365 |
| Sample 3 | 80 | 20 | 1.54 | 1145 |
| Sample 4 | 60 | 40 | 1.35 | 682 |
| Sample 5 | 40 | 60 | 1.26 | 774 |
| Sample 6 | 20 | 60 | 1.65 | 1141 |
| Sample 7 | 10 | 90 | 1.83 | 1246 |
| Sample 8 | 0 | 100 | 1.87 | 1351 |

The ionic liquids of samples 3 to 8 all exhibited a maximum exothermic peak height no greater than 2 W/g. In particular, the ionic liquids of sample 4 and sample 5 both had gross calorific values no greater than 1000 J/g, and maximum exothermic heat-flow peak heights no greater than 1.5 W/g. The ionic liquids of samples 3 and 4, obtained by mixing EMI-TFSI and EMI-BETI at appropriate proportions, exhibited both gross calorific values and maximum exothermic peak heights that were lower than those of the respective salts (EMI-TFSI and EMI-BETI).

Example 2

Figure 2:
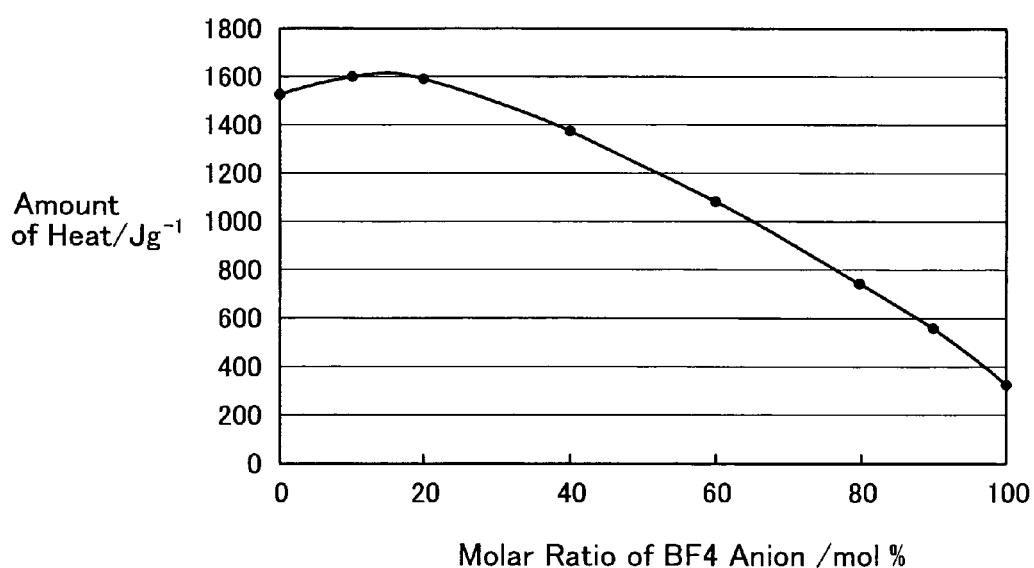
FIG. 2 is a graph illustrating the relationship between ionic liquid composition and gross calorific value.

Herein EMI-TFSI and 1-ethyl-3-methyl imidazolium tetrafluoroborate (EMI-BF$_4$) were prepared. EMI-TFSI and EMI-BF$_4$ share the same cation type but have different anions. These salts were mixed in the proportions given in Table 2 to prepare ionic liquids (samples 9 to 14) comprising two or more types of anion. Then a DSC measurement was performed on the ionic liquids, EMI-TFSI (sample 1) and EMI-BF$_4$ (sample 15) in the same way as in Example 1. The results are given in Table 2 and are illustrated in FIG. 2.

TABLE 2

|  | EMI-TFSI [mol %] | EMI-BF$_4$ [mol %] | Maximum exothermic peak height [W/g] | Gross calorific value [J/g] |
|---|---|---|---|---|
| Sample 1 | 100 | 0 | 3.78 | 1539 |
| Sample 9 | 90 | 10 | 3.92 | 1603 |
| Sample 10 | 80 | 20 | 3.84 | 1600 |
| Sample 11 | 60 | 40 | 1.90 | 1369 |
| Sample 12 | 40 | 60 | 1.43 | 1080 |
| Sample 13 | 20 | 80 | 1.00 | 741 |
| Sample 14 | 10 | 90 | 0.57 | 561 |
| Sample 15 | 0 | 100 | 0.40 | 336 |

The maximum exothermic peak heights of samples 11 to 15 were all no greater than 2 W/g. In particular, the maximum exothermic peak height of samples 12 to 15 were all no greater than 1.5 W/g. In all samples 12 to 15, also, the maximum exothermic peak height was no greater than 2 W/g and the gross calorific value was no greater than 1300 J/g. Moreover, in samples 13 to 15, all the gross calorific values were no greater than 1000 J/g and the maximum exothermic peak heights were no greater than 1.5 W/g. Thus, the gross calorific value and maximum exothermic peak height of EMI-TFSI could be reduced by mixing EMI-TFSI with EMI-BF$_4$.

Example 3

An electrolyte (sample 16) having a composition in which lithium bis(trifluoromethylsulfonyl)imide (LiTFSI) was dissolved to a 1.25M concentration in an ionic liquid (sample 4) comprising EMI-TFSI and EMI-BETI at a mole ratio of 60:40 was prepared. Also, an electrolyte (sample 17) having a composition in which LiBF$_4$ was dissolved to a 1.25M concentration in an ionic liquid (sample 11) comprising EMI-TFSI and EMI-BF$_4$ at a mole ratio of 60:40 was prepared. Further, an electrolyte (sample 18) having a composition in which LiTFSI was dissolved to a 1.25M concentration in EMI-TFSI was prepared.

Lithium secondary batteries of 18650-type were constructed, then using the electrolytes thus prepared. More specifically, a positive electrode mix comprising LiNiO$_2$ as a positive electrode active material was adhered to the surface of aluminum foil to prepare a positive electrode. The positive electrode mix comprises LiNiO$_2$, acetylene black (AB) and polyvinylidene fluoride (PVdF) at a weight ratio of 85:10:5 respectively. A negative electrode was prepared by adhering a negative electrode mix comprising Li$_4$Ti$_5$O$_{12}$, as a negative electrode active material, onto the surface of aluminum foil. The above positive electrode and negative electrode were stacked alternately interposing a separator (nonwoven fabric comprising methyl cellulose) therebetween. The stack was coiled and was housed in a tubular container made of aluminum. An electrolyte having the composition given in Table 3 was poured into the container, which was then sealed, to prepare thereby lithium secondary batteries (cells 16 to 18) using samples 16 to 18, respectively, as electrolytes.

On these lithium secondary batteries an overcharge test was carried out involving continuous charge, beyond the capacity of the batteries, at a constant current of 5 C (herein, about 4 Ah). As a result it was observed that in cell 18 the electrolyte decomposed rapidly before charge had reached twice the battery capacity. More specifically, heat release on account of electrolyte decomposition became marked as the SOC (state of charge) went past 195.3%, while the surface temperature of the battery reached its highest at 442.3° C. (see Table 3). For cell 16 and cell 17 on the other hand, charge to twice the battery capacity did not result in the above phenomenon. More specifically, when the heat released on account of electrolyte decomposition became marked in cell 16, the SOC thereof was 210%, and the highest surface temperature of the battery was 187.4° C. In cell 17, when the heat released on account of electrolyte decomposition became marked the SOC was 255%, and the highest surface temperature of the battery was 220.5° C. During the overcharge test no rupture, ignition or the like occurred in cell 16 or cell 17, while mist formation occurred.

TABLE 3

|  | Electrolyte | | Highest surface temperature (° C.) |
|---|---|---|---|
|  | Ionic liquid | Supporting electrolyte |  |
| Sample 16 | EMI-TFSI:EMI-BETI = 60:40 | LiTFSI (1.25M) | 187.4 |
| Sample 17 | EMI-TFSI:EMI-BF$_4$ = 60:40 | LiBF$_4$ (1.25M) | 220.5 |
| Sample 18 | EMI-TFSI | LiTFSI (1.25M) | 442.6 |

The explanation of the present invention thus far is merely illustrative in nature, and is not meant to limit the scope of the claims in any way. The technology as recited in the claims includes various alterations and modifications to the specific examples illustrated above.

Furthermore, the technical elements explained in the present specification and drawings provide technical value and utility either independently or through various combinations. The present invention, moreover, is not limited to the combinations described in the claims at the time of filing. Also, the purpose of the technology illustrated in the present specification and drawings is to satisfy multiple objectives simultaneously, such that satisfying any one of those objectives gives technical value and utility to the present invention.

The invention claimed is:

1. An ionic liquid satisfying the following conditions:
   (a) the ionic liquid comprises 1-ethyl-3-methyl imidazolium bis-trifluoromethylsulfonylimide (EMI-TSFI) and 1-ethyl-3-methyl imidazolium bis(perfluoroethylsulfonyl)imide (EMI-BETI) and satisfies the condition: (EMI-BETI)/{(EMI-TFSI)+(EMI-BETI)} ≧ 10 mol %, or comprises EMI-TFSI and 1-ethyl-3-methyl imidazolium tetrafluoroborate (EMI-BF$_4$) and satisfies the condition: (EMI-BF$_4$)/{(EMI-TFSI)+(EMI-BF$_4$)} ≧ 40 mol %; and
   (b) the ionic liquid has a maximum exothermic heat-flow peak height no greater than 2 W/g as measured by DSC, where a measurement temperature range is from an ordinary temperature to 500° C., and a rate of a temperature rise: 2° C./minute.

2. The ionic liquid according to claim 1, wherein the ionic liquid has a gross caloric value of no greater than 1000 J/g as measured by the DSC.

3. An electrochemical device comprising the ionic liquid according to claim 1.

4. A method for manufacturing an electrochemical device, comprising:

a step of selecting an ionic liquid having a maximum exothermic heat-flow peak height no greater than 2 W/g as measured by DSC, where a measurement temperature range is from an ordinary temperature to 500° C., and a rate of a temperature rise: 2° C./minute, wherein the ionic liquid comprises 1-ethyl-3-methyl imidazolium bis-trifluoromethylsulfonylimide (EMI-TFSI) and 1-ethyl-3-methyl imidazolium bis(perfluoroethylsulfonyl)imide (EMI-BETI) and satisfies the condition: (EMI-BETI)/{(EMI-TFSI)+(EMI-BETI)}≧10 mol %, or comprises EMI-TFSI and 1-ethyl-3-methyl imidazolium tetrafluoroborate (EMI-BF$_4$) and satisfies the condition: {(EMI-BF$_4$)/(EMI-TFSI)+(EMI-BF$_4$)} 40 mol %;

a step of preparing an ion-conductive material comprising the ionic liquid; and a step of manufacturing an electrochemical device using the ion-conductive material.

5. The method according to claim 4, wherein an ionic liquid having a gross calorific value no greater than 1000 J/g as measured by the DSC is selected as the ionic liquid.

* * * * *